INVENTOR
August L. Spetzler
BY
Pennie, Edmonds, Morton, Barrows & Taylor
ATTORNEYS

# United States Patent Office 3,141,291
Patented July 21, 1964

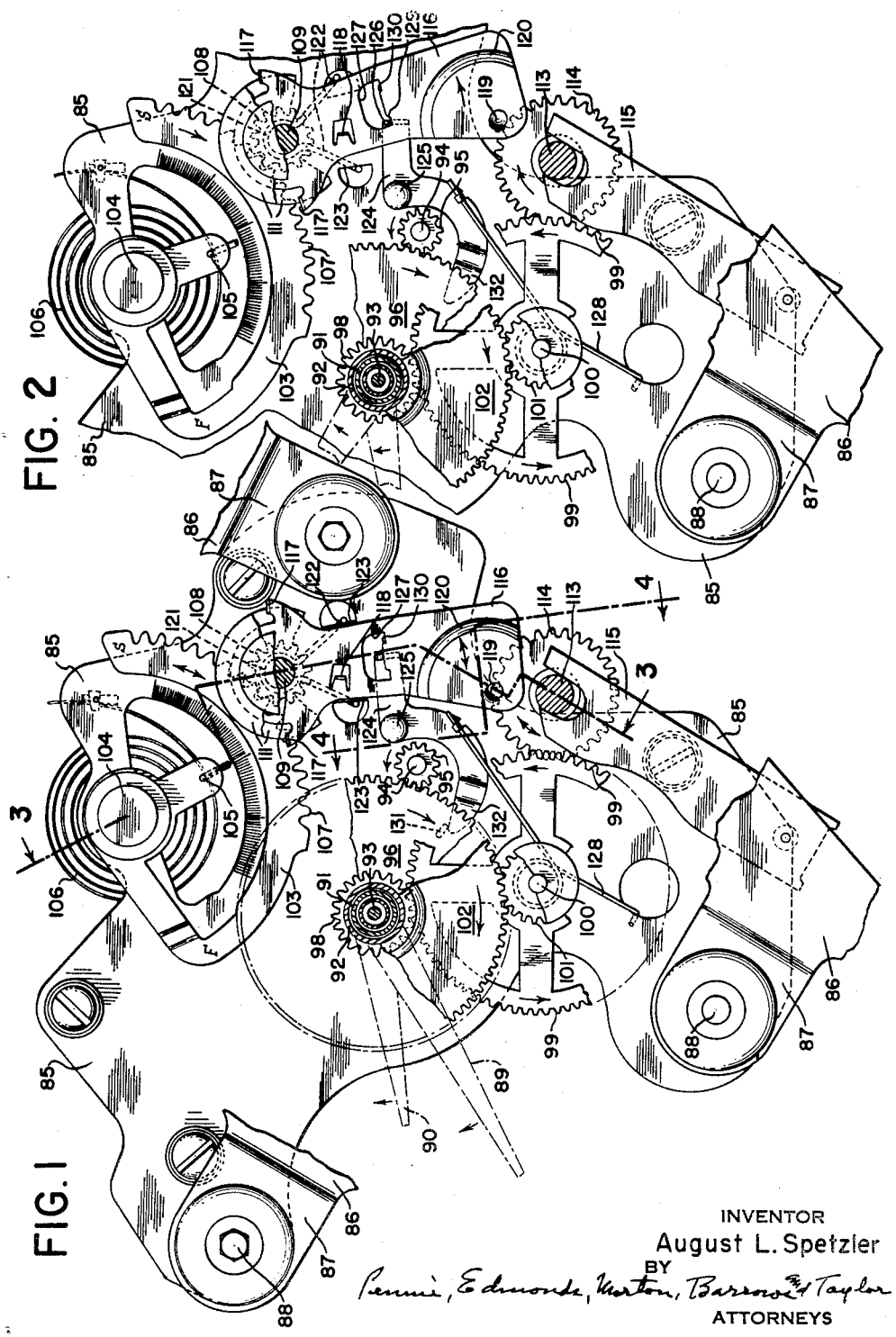

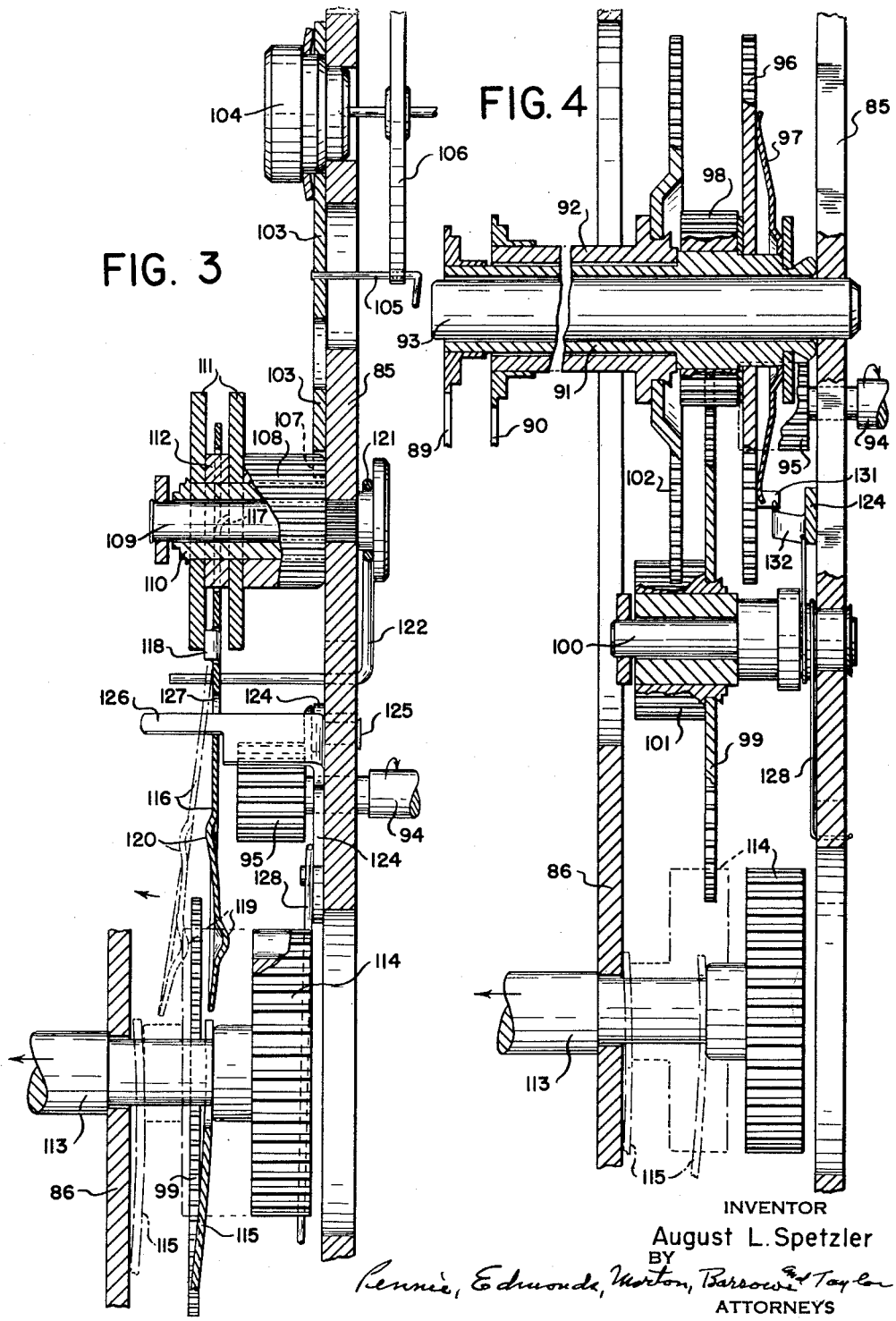

3,141,291
AUTOMATIC REGULATOR ADJUSTING
MECHANISM FOR CLOCKS
August L. Spetzler, Peru, Ill., assignor to General Time
Corporation, New York, N.Y., a corporation of
Delaware
Original application June 14, 1957, Ser. No. 665,810.
Divided and this application Feb. 1, 1961, Ser. No.
86,528
4 Claims. (Cl. 58—85.5)

This invention relates to the automatic regulation of timepieces and particularly to improvements in that type of automatic regulating wherein, beyond a predetermined small change in setting, or critical correction, of the clock hands, for example, ten minutes, a predetermined small maximum change in the adjustment of the rate regulating mechanism is effected, but wherein for smaller changes in the setting of the hands, the change in adjustment of the regulator is proportional to the hands correction.

The primary object of the present invention is to provide a construction of such automatic regulating mechanism that will be especially suitable for embodiment in clocks, such as automobile clocks, which are provided with some form of power operated means for driving the clock mechanism, and which, consequently, are not required to be wound by hand.

It has been found desirable to provide in such clocks a mechanism for preventing any further change in the regulator adjustment for a predetermined time, for example, one hour, after any change in setting which has involved also a change in the regulator adjustment. The inclusion of such mechanism facilitates the testing and adjustment of the clock mechanism during manufacture, and in addition, renders it impossible for the regulator to be thrown badly out of adjustment by successive changes in the setting of the clock hands as, for example, should a child find the clock an attractive plaything.

Accordingly, another object of the invention is to provide a simple and effective mechanism for disabling the regulation adjustment for a predetermined time after a correction of the hands has been made which has effected a change in adjustment of the regulator.

Another object of the invention is to provide an automatic regulating mechanism which is of simple construction and has few parts and which, consequently, can be incorporated in a clock mechanism at a minimum increase in the cost of manufacture, and which because of its simplicity, will operate over a long period of time without requiring attention or servicing.

Throughout the specification and claims of this application it will be understood that the term "clock mechanism" includes not only a power operated clock such as an automobile clock, but also a spring wound clock, or, in fact, any form of timepiece, and further it will be understood that this term includes mechanism for driving the hands and the timekeeping mechanism. Furthermore, such mechanism can be of any form desired and suitable to the particular timepiece. It will be further understood that the term "hands" is used to include not only the time-indicating fingers which this term usually connotes, but also any type or form of time-display or time-indicating device which may be desired to incorporate in the timepiece.

The invention will be understood from a consideration of the accompanying drawings and the following description of the several embodiments of the improved automatic regulation mechanism illustrated therein.

In these drawings:

FIG. 1 is a front elevation of the automatic regulator adjusting mechanism drawn to an enlarged scale;

FIG. 2 is a view similar to FIG. 1 with the parts in different position, the hands having been reset forward by the critical amount (10 minutes);

FIG. 3 is a view in vertical section taken on broken line 3—3 of FIG. 1 and drawn to a larger scale;

FIG. 4 is a similar section taken approximately on broken line 4—4 of FIG. 1 to show the drive mechanism for the clock hands;

Figure 6:
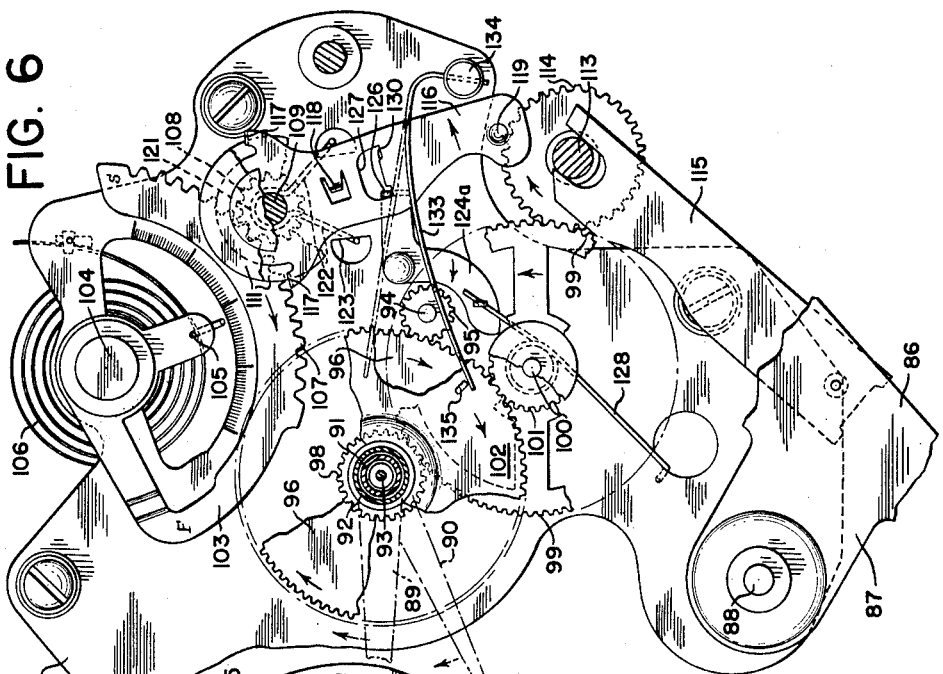
FIG. 6 is a view similar to FIG. 5 with the parts in different position, the clock having been reset forward by the critical amount (10 minutes).

The automatic regulator adjusting mechanism shown is especially adapted to be incorporated in an automobile clock. In this mechanism the principal frame member is indicated by numeral 85 and an outer frame member by numeral 86. Frame member 86 is supported in spaced relation to frame 85 by means of three leg members 87 which are formed from the same sheet of metal as frame 86 and bent inwardly or rearwardly and secured to posts 88 projecting from frame 85.

Referring now to FIGS. 1 and 4 the minute hand 89 and hour hand 90 are secured respectively to an inner sleeve shaft 91 and outer sleeve 92. These sleeves are supported on a stationary shaft 93 which is supported by the main frame member 85. The drive from the operating motor and timekeeping mechanism of the clock is from a shaft 94 and pinion 95, at its forward end, to minute gear 96, which turns minute sleeve 91 through a friction or slip device provided by a spring disk 97, both of which are arranged at the rear end of sleeve 91.

The drive of the hour sleeve 92 carrying hour hand 90, is through a pinion 98 on the minute sleeve to a gear 99 which rotates on a stationary shaft 100 projecting from frame 85 below shaft 93. A pinion 101 forms the hub of gear 99 and meshes with the hour gear 102 which is fixed to the inner end of the hour sleeve 92.

The regulator comprises a sector 103 which is pivoted at 104 to frame 85 and carries a pin 105 that projects through an aperture in frame 85 and engages the outermost coil of the hair spring 106. Sector 103 is actuated in either the slow or fast direction by means of gear teeth 107 formed in its outer periphery and which intermesh with the teeth of a pinion 108. This pinion rotates on a short stationary shaft 109 (FIG. 3) projecting from frame 85 and the pinion has a hub 110 of reduced diameter on which two circular disks 111 are securely fixed these disks being spaced apart by a collar 112 of considerably smaller diameter. These disks form a part of an actuating mechanism by which pinion 108 and regulator sector 103 may be turned a predetermined amount during the setting operation of the clock hands.

The hand setting knob (not shown) is mounted on the forward end of the setting shaft 113. This shaft is mounted in an aperture in front frame member 86 for both rotary and axial or sliding movement. The forward portion of shaft 113 is supported in a cover member forming a part of the instrument panel of the automobile and is also not shown. A pinion 114 is fixed to the inner or rear end of setting shaft 113 and is arranged to mesh with the teeth of gear 99 when the shaft is shifted forward against the action of a flat spring 115 which is mounted on the inner surface of frame 86. The purpose of such spring is to hold the shaft 113 in the normal or inner position where pinion 114 is disengaged from gear 99.

The shift lever is indicated by 116. This is a flexible resilient member and is mounted to have rotative as well as rocking movement. Shift lever 116 itself actuates the rate regulator adjusting mechanism and, in fact, forms part of such mechanism.

Lever 116 constitutes a part of the disabling and clutch mechanism. Shift lever 116 also constitutes part of the mechanism which limits the adjustment of the rate regulator to a predetermined maximum amount regardless of the fact that the clock hands may be moved considerably beyond the critical amount of ten minutes.

The shift lever 116 is of thin but stiff, flexible, resilient steel, or other suitable material. It is mounted on collar 112 between the flat plates 111, and for this purpose has a circular aperture at its upper end to receive this collar, being assembled with plates 111 and collar 112 on the hub 110 of pinion 108. The aperture in lever 116 is a loose fit on collar 112 (FIG. 3) so that the lever may both turn or pivot freely on this collar, and also rock freely on it in the plane of the collar axis, which is also the axis of the hub or sleeve shaft 110 for pinion 108.

Anent such rocking movement the lever is substantially thinner than the collar, and a pair of inwardly turned feet 117 are arranged one on each side of the inner portion of the shift lever and in a plane passing through the center of shaft 109 and of the collar. These feet are formed by bending inwardly two narrow projections at each side of lever 116 so that they will bear against the surface of inner disk 111. These feet, therefore, form a fulcrum on this surface for the rocking movement of the lever. Also when lever 116 is rocked outwardly from the full line position of FIG. 3 to the dotted position, a tongue 118 is forced against the surface of outer disk 111 so that if rotative movement is now imparted to lever 116, the disks 111 and pinion 108 will be rotated and thus adjusting movement will be imparted to regulator sector 103.

Tongue 118 is formed by a combined cutting and stamping operation which first outlines the tongue and then bends it at right angles to the plane of lever 116 so that the edge of the tongue will be in position to engage the flat smooth outer disk 111.

Near the outer end of shift lever 116 (inner surface) is formed a prominence or nose 119 (FIG. 3) which is preferably located at the center of a semi-circular rib 120 the purpose of which is to stiffen the outer portion of the lever. The function of nose 119 is to engage the outer end surface of pinion 114 in an area outside of the root circle of the pinion teeth. In other words, the ends of these teeth frictionally engage nose 119 when setting shaft 113 is moved axially outward, so that when the shaft is turned the rotative movement above referred to will be imparted to shift lever 116.

The outward movement of setting pinion 114 causes both rocking and bending of the shift lever thereby effecting a firm frictional engagement of tongue 118 with the outer disk 111. Consequently, the turning movement of the setting shaft will cause, through the shift lever, a limited turning movement of pinion 108, and this will produce a small angular movement of sector 103, thus changing the adjustment of the rate regulator.

When the setting knob is released and setting shaft 113 is moved back to its normal position by flat spring 115, the nose of shift lever 116 is released from the side of pinion 114. It now becomes important to return the shift lever to its original central position from which it can be moved in either direction according to whether the pinion 114 is turned to set the clock hands ahead or backwards. A spring 121 is mounted on the rear projection of shaft 109 (FIGS. 1 and 3) having two downwardly projecting arms 122.

The lower portions of spring arms 122 are bent forward to horizontal position and extend through two semi-circular openings in frame 85 and engage the opposite side edges of shift lever 116. When the lever is at the central position these arms also engage the proximate straight edges 123 of the two semi-circular apertures just referred to. These edges are in line with the side edges of shift lever 116 and thus serve to determine the central position of the shift lever. When the lever is swung in one direction one of the arms 122 is stressed, the opposite arm being held against the edge of its aperture, whereas when the shift lever is swung in the opposite direction, the reverse action takes place.

The disabling of the regulator adjusting mechanism so as to prevent, for a predetermined period of time, a further change in the regulator, following a correction of the clockhands which has produced a regulator adjustment, is accomplished by means of a disabling lever 124 which is pivoted at 125 to frame 85. The body of this lever lies close to the outer surface of frame 85, but has a forward projection at its right hand which terminates in a small finger 126. This finger projects through an aperture 127 in shift lever 116 and when the lever is in its central and normal position finger 126 is at the center of this aperture.

A spring member 128 coiled around the hub of shaft 100 which supports gear 99 (FIG. 4), causes finger 126 to be urged against the bottom edge of aperture 127. At the opposite ends of this aperture are two notches forming shoulders 129 and 130. Hence, when shift lever 116 has been shifted sufficiently in one direction by rotation of setting shaft 113, finger 126 will be moved into one of these notches and behind shoulder 129, and when the lever is shifted sufficiently in the opposite direction the finger will be moved into the opposite notch and behind shoulder 130. When behind either of these shoulders shift lever 116 is prevented from returning to its central position.

A critical correction of the clock hands, for example, ten minutes, is involved in causing such a shifting of lever 116. Consequently, if the clock hands are reset to a greater extent than ten minutes either forwards or backwards, the movement of lever 116 is stopped by one end or the other of aperture 127 striking finger 126. This limits the adjustment of the regulator to the predetermined amount. During the continued resetting beyond the critical correction the edges of the teeth of pinion 114 slide beneath the nose 119 on the shift lever.

A second change in the regulator by a further resetting of the hands cannot take place until finger 126 has been lifted to clear shoulders 129 or shoulder 130 and allow lever 116 to center itself.

In order to cause resetting of shift lever 116 at its central position after a maximum change in the regulator adjustment which has caused finger 126 to engage one or the other of the two shoulders 129, 130 a tang or projection 131 on the side of minute wheel 96 is arranged to engage the end of the downwardly curved tail portion 132 of disabling lever 124. Consequently, this lever is shifted once per hour to lift finger 126.

It will be understood that any change in the setting of the clock hands less than the critical correction, that is, one which does not cause the shift lever 116 to be moved sufficiently for finger 126 to engage one or the other of shoulders 129 or 130, will produce a change in the adjustment of the regulator which is proportional to the hands correction.

Figure 5:
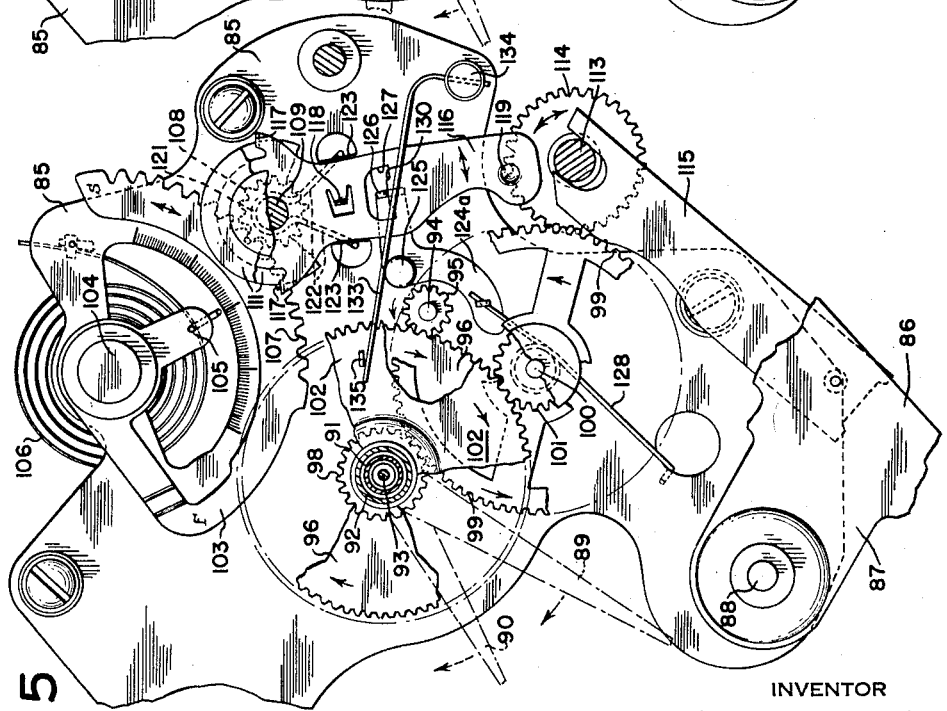
FIG. 5 shows a modified form of the automatic regulator adjusting mechanism and is a view in elevation similar to FIG. 1.

Referring now to FIGS. 5 and 6 which illustrate a modification, the construction here is in all points similar to construction described in connection with FIGS. 1–4, except for the resetting of the shift lever 116 every twelve hours, instead of once an hour as previously described. Instead of resetting the disabling lever 124A by a projection on the minute wheel 96, which in the former case engaged the tail portion of the disabling lever, such tail portion is eliminated and an elongated spring or spring mounted member 133 is positioned with one end fixed to a post 134 projecting from the side of frame member 85. This spring member is of L-shape and its free end portion passes close to the outer surface of shift lever 116 and also in proximity to finger 126 of the disabling lever 124A.

The left end of spring member 133 extends into proximity with the side of the hour gear 102. This gear 102 is provided with a lateral projection 135 which, in its rotation, engages the outer end portion of spring member 133, bending the spring member downwardly as shown in FIG. 6. As the projection 135 passes beyond the end of spring 133, the spring snaps upwardly and strikes finger 126 lifting it free of whichever shoulder 129 or 130 with which it may have been engaged. Thus the disabling member 124A is lifted once every twelve hours.

The invention has been set forth in connection with several embodiments and it will be understood that further modifications thereof may be made which come within the scope of the appended claims.

This application is a division of my copending application, Serial No. 665,810, filed June 14, 1957.

I claim:

1. In a clock, a movement including a rate regulator, hands driven by said movement, setting mechanism for said hands comprising a rotatable setting shaft including a setting pinion axially shiftable into and out of mesh with a setting gear, and means for actuating said regulator so as to change the regulator adjustment when the hands are set comprising: a shaft operatively connected to adjust the regulator, a flexible shift lever mounted on said shaft for both rotary and rocking movements, means for biasing said lever in its rotary movement to a central position, a clutch mechanism for connecting said lever to said shaft and engageable by the rocking movement of said shift lever, the outer portion of the shift lever being disposed on the same side of the setting pinion as the setting gear so that when the setting pinion is shifted axially to cause its teeth to mesh with those of the setting gear one side of the setting pinion frictionally engages the shift lever whereby both rocking and rotational movement can be transmitted thereto, continuing axial movement after such contact causing the flexing of the shift lever and the consequent engagement of the clutch mechanism so that rotation of the setting pinion in order to set the hands will cause the turning of the regulator adjusting shaft.

2. A clock as set forth in claim 1 wherein the shift lever is provided with a protruding nose portion which engages the side face of the setting pinion radially outwardly of the root circle of the pinion teeth.

3. In a clock as set forth in claim 1 wherein the shift lever has a closed aperture, one edge of which has a notch and shoulder at each end, one wall of such notch being formed by one end of the aperture, a stop lever pivoted on the clock frame and having a finger thereon arranged to continuously project into the aperture, means acting on the stop lever to bias the finger against the side of the aperture having the notches so that the finger will move into one of these notches and lock the shift lever when said lever has been moved to engage either end of the aperture with the stop finger when setting the hands forward or backward, the improvement which comprises, a spring-actuated striker mounted on the clock frame adjacent the stop finger, and means operated by the clock for periodically stressing and then instantaneously releasing the striker, the striker when thus released, striking the stop lever and moving it in a direction to disengage its finger from either of said shoulders so as to permit the shift lever to return to its central position.

4. A clock as set forth in claim 1 wherein the shift lever is a thin flexible member, and the clutch mechanism comprises a pair of rigid flat disks disposed in fixed spaced relation on the regulator adjusting shaft, the shift lever having an aperture adjacent one end for receiving the shaft and being disposed between the spaced disks, the shift lever having a pair of feet projecting axially of the shaft from diametrically opposite sides of the lever, the ends of these feet being in contact with one of the disks on a line passing through the axis of the shaft, and a tongue projecting from the opposite side of the shift lever from the pair of feet, the rocking movement of the shift lever caused by the pressure of the setting pinion against its flexible outer end portion causing the member to pivot on its pair of feet and engage the tongue with its associated disk thereby to engage the clutch mechanism.

References Cited in the file of this patent

UNITED STATES PATENTS

| 2,941,349 | Lux | June 21, 1960 |
| 2,976,673 | Petters et al. | Mar. 28, 1961 |
| 3,016,687 | Rabinow | Jan. 16, 1962 |

FOREIGN PATENTS

| 787,002 | Great Britain | Nov. 27, 1957 |